UNITED STATES PATENT OFFICE.

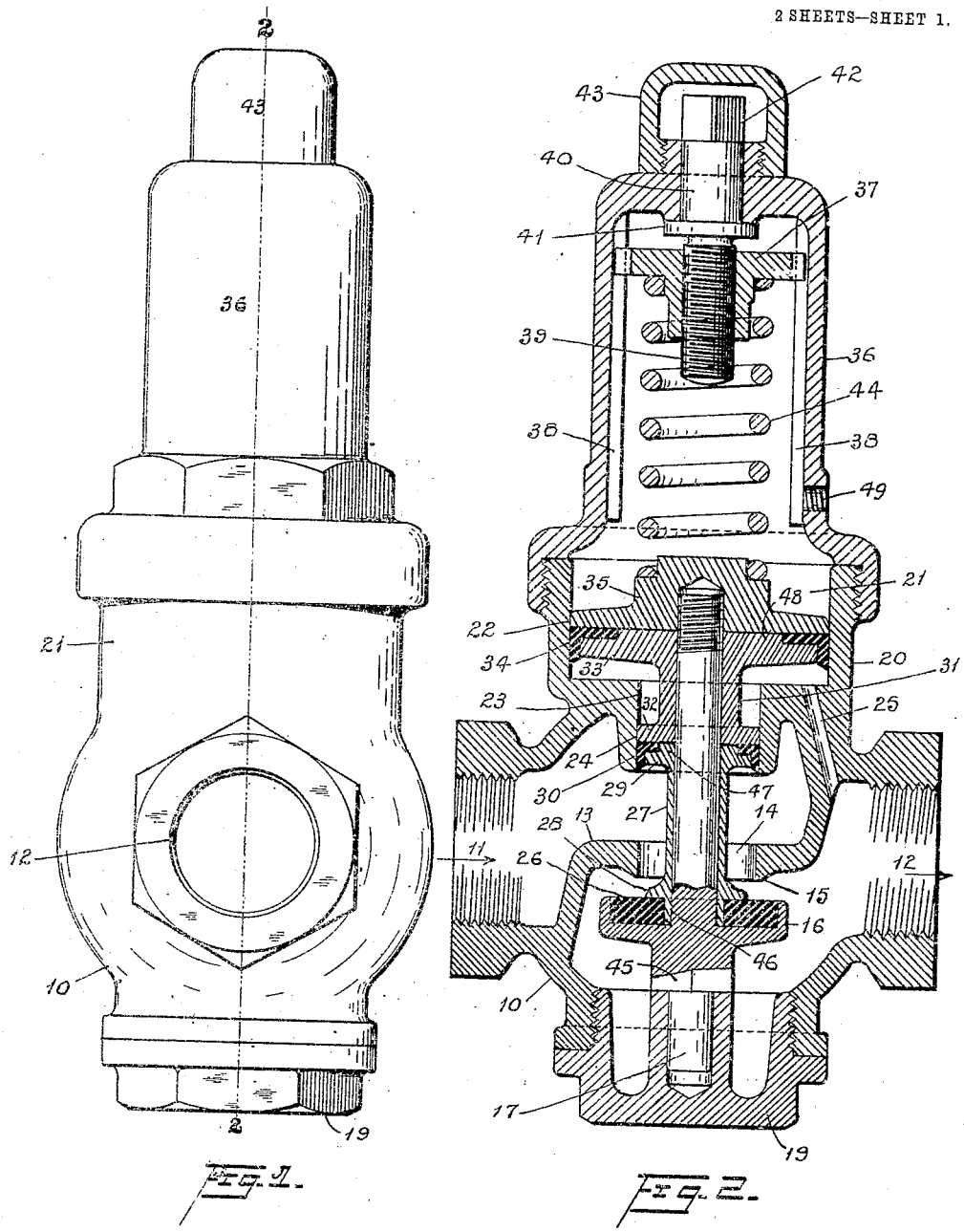

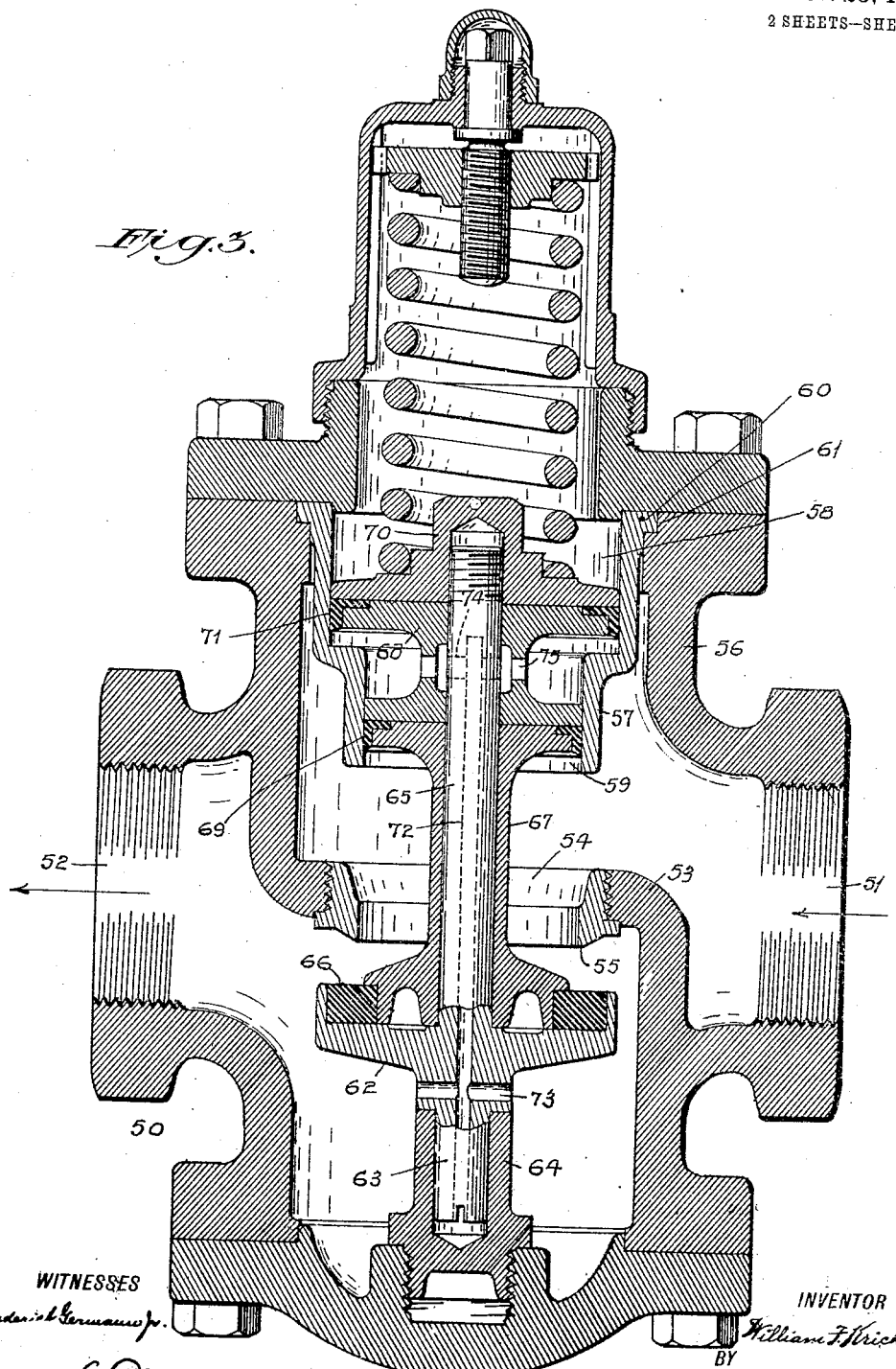

WILLIAM F. KRICHBAUM, OF NEWARK, NEW JERSEY, ASSIGNOR TO FOSTER ENGINEERING COMPANY, A CORPORATION OF NEW JERSEY.

PRESSURE-REGULATOR.

941,153.    Specification of Letters Patent.    Patented Nov. 23, 1909.

Application filed April 19, 1909.   Serial No. 490,764.

*To all whom it may concern:*

Be it known that I, WILLIAM F. KRICHBAUM, a citizen of the United States, residing at Newark, in the county of Essex and State of New Jersey, have invented certain Improvements in Pressure-Regulators, of which the following is a specification.

This invention relates to that class of pressure regulators designed to receive a fluid under varying initial pressures and deliver it at a reduced but practically constant pressure.

More particularly it belongs to that class of pressure regulators wherein the passage of the fluid is controlled by a valve of comparatively small area operated by a piston or diaphragm of comparatively great area, the pressure of the fluid upon the delivery side of the pressure regulator being applied to the piston or diaphragm to close the main valve.

The objects of the invention are to secure a pressure regulator of simple construction, and one in which the valve is balanced at a point above the main valve opening, thus avoiding the accumulation of grit or sediment in the balancing chamber; to thus secure a better and more perfect action of the valve; to secure such a valve which is operated by means of the reduced pressure acting upon a piston actuating the main valve to close the same against the action of an opposing pressure, such as a spring or weight, and to obtain other advantages and results as may be brought out in the following description.

Referring to the accompanying drawings, in which like numerals of reference indicate corresponding parts in each of the several figures: Figure 1 is an end elevation of my improved pressure regulator; Fig. 2 is a section of the same on line 2—2 of Fig. 1, and Fig. 3 is a similar section of a modified construction for larger sizes.

In said drawings, 10 indicates the valve casing or body of the regulator, and said body is provided with an inlet 11 and an outlet 12. Interposed between said inlet and outlet is a partition 13 having a horizontally disposed portion with a valve opening 14, forming at the under side of said partition an annular valve seat 15, affording communication between the inlet and outlet.

16 indicates the main valve controlling the opening 14, and said valve 16 has an upwardly projecting stem 18 extending through sleeves 27 and 31, and having at its end a screw threaded engagement as shown with a nut 35.

17 indicates a stem depending from the lower side of the valve 16 and working in a recess in a plug 19 screwed into the under side of the valve casing or body 10. The valve casing or body 10 has an upward extension 20, said extension providing an upper large cylinder 21 for a controlling piston 22 on the valve stem 18, and a lower reduced or small cylinder 23 in axial alinement with the upper large portion and adapted to receive a balancing piston 24, also on the stem 18. A port 25 leads from the low-pressure or outlet side 12 of the valve body 10 into the said cylinder 21.

In detail construction, the main valve 16 is cupped or recessed to receive a removable disk 26, and the sleeve 27 on the upper stem 18, has at its lower end a flange 28 adapted to overlap the said removable disk 26 and hold the same in its position. Said sleeve 27 projects up through the main valve opening 14 into the lower reduced or small cylinder 23 of the upper portion of the valve casing or body 10, and is thereat provided with an upper flange 29 recessed at its edges to receive a cup washer 30 to fit said cylinder. The second or upper sleeve 31 has at its lower end a flange 32 to rest upon the said cup washer 30, and at its upper end, within the large cylinder 21, said sleeve 31 has an enlarged flange 33 recessed at its edges to receive a cup washer 34 fitting said cylinder 21. The nut 35 on the threaded end of the valve stem 18, combines and secures all said parts together in place on said stem, and obviously this nut has to be screwed on after the valve 16 and parts carried by it have been inserted into the valve casing. In doing this the valve is held from below by a wrench or the like on its squared lower portion 45 and access had to the nut 35 at the top of the valve, all the intermediate parts being out of sight. Hence, the valve disk 26 and cup washers 30 and 34 being compressible, the ends of the sleeves 27 and 31 are extended through the centers of said parts, as at 46, 47, and 48, to limit compression of them to the proper degree.

A spring chamber 36 is secured to the upper end of the extension 20 of the valve casing, and within said chamber is a helical spring 44 engaging at its lower end the nut 35 secured to the upper end of the valve stem 18. Said spring chamber 36 is provided with interior ribs 38, 38, which extend longitudinally of the same, to receive a slotted spring-adjusting nut 37, and serve to prevent said nut from rotating, while permitting it to slide up and down. The said spring-adjusting nut 37 is centrally tapped to receive a screw 39, and said screw has a cylindrical portion 40 extending upward through a bearing in the top of the spring chamber 36, a flange 41 at the lower end of said cylindrical portion limiting outward movement under the force of the spring 44. The extreme projecting end of the adjusting screw 39 is squared, as at 42, to receive a wrench, and provides a means for regulating the compression of the spring 44.

The spring chamber 36 is provided with a screw threaded vent at 49, and the extreme upper end of said chamber is screw threaded to receive a cap 43, which serves to protect the adjusting screw 42 and prevent its adjustment being tampered with. It should be noted that a flexible diaphragm of ordinary well-known construction would be an equivalent for the controlling piston 22, in the present invention.

In operation, the fluid enters the supply end 11 of the pressure regulator, establishing an equilibrium between the top portion of the valve 16 exposed through the main valve opening 14 and the under surface of the balancing piston in the small chamber 33. The fluid also passes through said main valve opening 14 to outlet 12, and at the same time through port 25 to the under side of piston 33 in the large chamber 21 of the valve. When the fluid attains at the outlet end 12 of the pressure regulator a pressure greater than the opposing power of the spring 44, therefore, it forces piston 33 upward carrying the main valve 16 toward its seat, and restricting the passage of fluid through the regulator. In other words, any increase in the delivery pressure acts upon the piston 33 and overcomes the power of the spring 44, closing the main valve, while a drop or decrease in delivery pressure acts vice versa. A constant delivery pressure is thus maintained regardless of variation in the initial pressure. By adjusting the spring 44 a delivery pressure of any desired reduction from the initial pressure may be secured. Turning the adjusting screw 42 to the right increases, and to the left decreases, the delivery pressure.

In Fig. 3 I have illustrated a slightly modified construction which is used in the larger sizes of valves, the objects of such modified construction being to enable the valve casing to be of cast iron and only the valve seat and cylinders of that more expensive composition which is necessary for such parts. In said figure, 50 indicates the valve casing with inlet 51 and outlet 52 separated by a partition 53 in which is screwed or otherwise removably seated a bushing 54 providing the valve seat 55. The upward extension 56 of the valve casing receives from its top a liner 57 in which are formed the controlling-piston cylinder 58 and the balancing-piston cylinder 59. The said liner is shown as supported by a flange 60 at its upper edge entering an annular recess 61 in the valve casing, although obviously other equivalent supporting means might be employed. The valve 62 has a stem depending as at 63 into a socket 64 and also extending upward as at 65 into the cylinders 58 and 59. A valve disk 66 on the valve 62 is held by sleeve 67 whose upper end abuts against an upper sleeve 68 and therewith grips a cup-washer 69 and forms the balancing piston in the cylinder 59. Above the upper sleeve 68 is a nut 70 adapted to screw onto the valve stem against said sleeve and therewith grip a cup washer 71 and form the controlling piston in the cylinder 59. These features are substantially as heretofore described in connection with Figs. 1 and 2. In order to afford communication between the delivery end 52 of the flow passage and the control-piston cylinder 59, the valve stem is longitudinally bored or channeled, as at 72, with lateral branches 73 leading therefrom into the flow passage beneath the valve 62, and other branches 74 adapted to register with similar passages 75 through the sleeve 68 between the balancing piston and controlling piston. The operation of the valve is as already described in connection with Figs. 1 and 2.

Having thus described the invention, what I claim is:

1. In a pressure regulator, the combination of a valve casing providing a flow passage with a valve seat, a balance-piston cylinder above said valve seat and an enlarged chamber above said cylinder, said chamber being in communication with the delivery end of said flow-passage, a recessed valve for said seat having a stem projecting into said cylinder and chamber, a valve disk in said recess, a sleeve having at its lower end a flange to engage said disk and a projection extending through the disk, an upper sleeve having a lower end engaging the upper end of the lower sleeve in the said balance-piston cylinder, a nut adapted to screw onto the stem against said upper sleeve in the said enlarged chamber, a washer held between the adjacent ends of said sleeves and forming a piston in the cylinder, a member held between said nut and upper sleeve imperviously closing the said chamber and permitting movement of its said holding parts, and means holding said member in normal position.

2. In a pressure regulator, the combination of a valve casing providing a flow passage with a valve seat, a balance-piston cylinder above said valve seat and an enlarged chamber above said cylinder, said chamber being in communication with the delivery end of said flow passage, a valve having a disk for said seat and a stem projecting into said cylinder and chamber, a sleeve on said stem above said disk, an upper sleeve above said lower sleeve, a nut adapted to screw onto the stem against said upper sleeve in the said enlarged chamber, a washer held between the adjacent ends of said sleeves and forming a piston in the balance-piston cylinder, a member held between said nut and upper sleeve imperviously closing the enlarged chamber and permitting movement of its said holding parts, and means holding said member in normal position.

3. The combination with a casing providing a flow passage with a valve seat, of a valve having a stem and an annular radial seat around said stem, an annular valve disk in said seat providing a space between itself and the said stem, a sleeve on said stem extending through said annular disk into engagement with the floor of its said seat and having an annular flange engaging the top of the disk, and means for holding said sleeve in fixed position with respect to said stem.

4. In a pressure regulator, the combination of a valve casing providing a flow passage and an upper extension, a liner removably inserted in said upper extension and providing upper and lower cylinders of different diameters, a valve for said valve seat having a stem extending from the delivery side of the valve into said cylinders, a sleeve on the valve stem having its opposite ends in the said upper and lower cylinders respectively and a lateral aperture intermediate said ends, the said stem having a duct leading from below the valve to said lateral aperture of the sleeve, a nut holding said sleeve on the stem, a member held by said nut on the sleeve forming a piston in the upper cylinder, and means holding said piston yieldingly in position.

5. In a pressure regulator, the combination with a casing providing a flow passage with a valve seat, a cylinder above said valve seat and an upper chamber, a plug in said casing opposite said valve seat, a valve for said valve seat having a stem extending from the delivery side of the valve into said cylinder and chamber, said stem being adapted below the valve and next said plug to receive turning means, a sleeve on the valve seat above said valve, an upper sleeve having its lower end engaging the upper end of said lower sleeve in the balance-piston chamber, a washer held between the adjacent ends of said sleeves and forming a piston in said cylinder, a nut adapted to screw onto the stem against the upper sleeve, a member held between said nut and upper sleeve imperviously closing the enlarged chamber and permitting movement of its holding parts, and means holding said member in normal position.

WILLIAM F. KRICHBAUM.

In the presence of—
RUSSELL M. EVERETT,
FRANCES E. BLODGETT.